(12) United States Patent
Qiu et al.

(10) Patent No.: US 8,575,908 B2
(45) Date of Patent: Nov. 5, 2013

(54) VOLTAGE REGULATOR INCLUDING CONSTANT LOOP GAIN CONTROL

(75) Inventors: Weihong Qiu, San Jose, CA (US); Shangyang Xiao, Sunnyvale, CA (US); Nattorn Pongratanankul, Sunnyvale, CA (US)

(73) Assignee: Intersil Americas LLC, Milpitas, CA (US)

( * ) Notice: Subject to any disclaimer, the term of this patent is extended or adjusted under 35 U.S.C. 154(b) by 808 days.

(21) Appl. No.: 12/539,035

(22) Filed: Aug. 11, 2009

(65) Prior Publication Data

US 2010/0072964 A1    Mar. 25, 2010

Related U.S. Application Data

(60) Provisional application No. 61/099,727, filed on Sep. 24, 2008.

(51) Int. Cl.
*G05F 1/10* (2006.01)
(52) U.S. Cl.
USPC ................ 323/282; 323/222; 323/284
(58) Field of Classification Search
USPC .......... 323/207, 222, 265, 271–273, 282, 288
See application file for complete search history.

(56) References Cited

U.S. PATENT DOCUMENTS

| | | | | |
|---|---|---|---|---|
| 3,160,809 | A | * 12/1964 | Vanderschmidt | 324/459 |
| 4,035,710 | A | * 7/1977 | Joyce | 363/37 |
| 5,545,970 | A | 8/1996 | Parkes, Jr. | |
| 6,084,451 | A | * 7/2000 | Choi et al. | 327/172 |
| 6,288,604 | B1 | 9/2001 | Shih | |
| 6,300,749 | B1 | 10/2001 | Castelli | |
| 6,924,634 | B2 | * 8/2005 | Jianping et al. | 323/299 |
| 6,972,974 | B2 | * 12/2005 | Inn et al. | 363/89 |
| 6,992,526 | B2 | 1/2006 | Cheng | |
| 7,166,991 | B2 | 1/2007 | Eberlein | |
| 7,170,264 | B1 | * 1/2007 | Galinski | 323/222 |
| 7,619,395 | B2 | * 11/2009 | Mok et al. | 323/224 |
| 7,764,053 | B2 | * 7/2010 | Mehas et al. | 323/222 |
| 7,936,160 | B1 | * 5/2011 | Sheehan | 323/285 |

* cited by examiner

*Primary Examiner* — Adolf Berhane
*Assistant Examiner* — Yemane Mehari
(74) *Attorney, Agent, or Firm* — Paul A. Bernkopf; Graybeal Jackson LLP; Bryan A. Santarelli

(57) ABSTRACT

A voltage regulation circuit includes a power stage for generating a regulated output voltage responsive to an input voltage and at least one PWM signal. A voltage divider circuit is connected to the output of the power stage and generates a feedback voltage. First circuitry generates the at least one PWM signal responsive to a voltage error signal, a filtered output voltage signal and a ramp voltage signal. The filtered output voltage is used for substantially removing loop gain change caused by the voltage divider circuit. A voltage compensation circuit generates the voltage error signal responsive to a feedback voltage and a reference voltage.

22 Claims, 4 Drawing Sheets

VOLTAGE REGULATOR INCLUDING CONSTANT LOOP GAIN CONTROL

CROSS-REFERENCE TO RELATED APPLICATIONS

This application claims the benefit of U.S. Provisional Application No. 61/099,727, filed, Sep. 24, 2008, entitled CONSTANT LOOP GAIN CONTROL FOR VOLTAGE REGULATOR, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
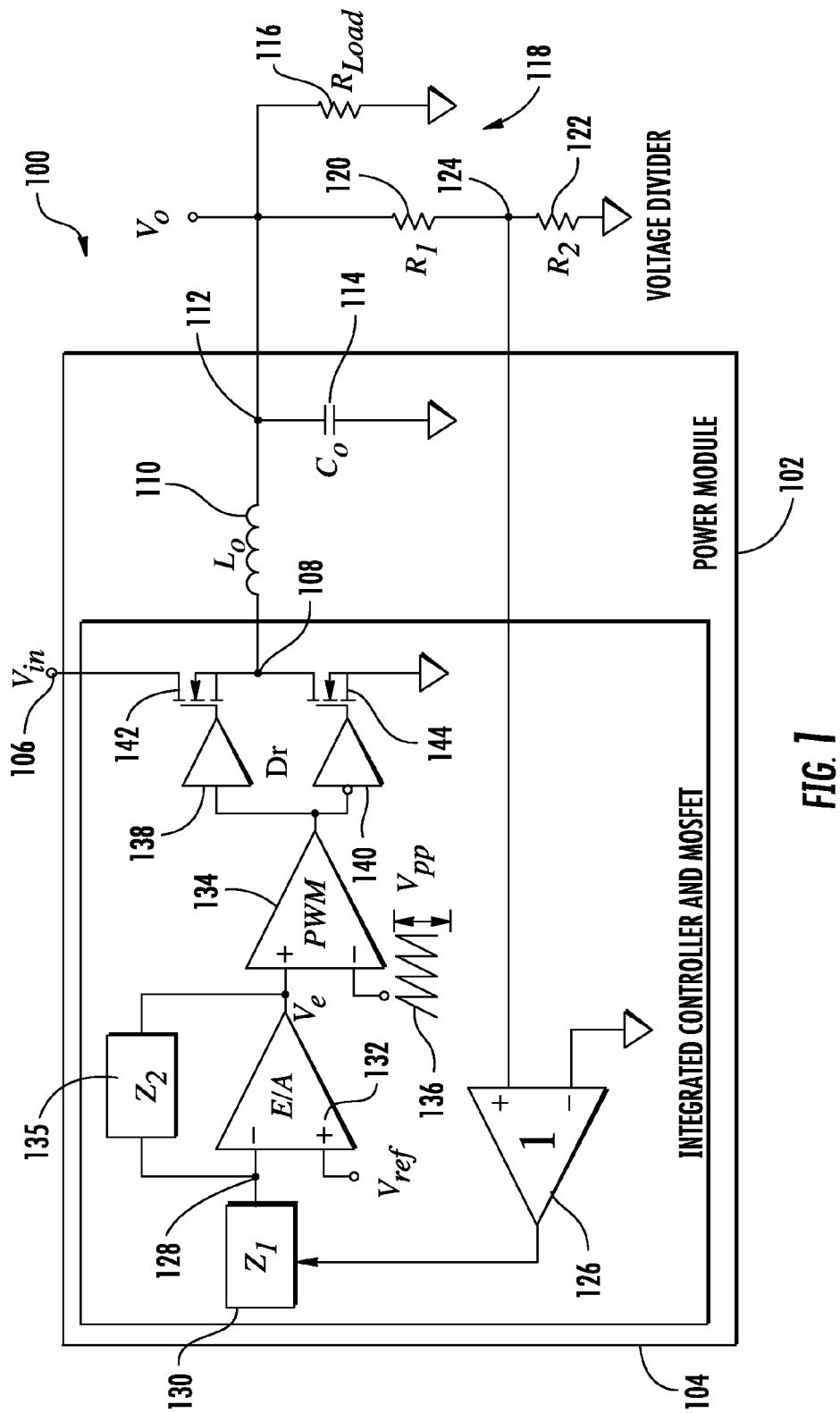
FIG. 1 is a block diagram of a buck regulator/module.

Referring now to the drawings, wherein like reference numbers are used herein to designate like elements throughout, the various views and embodiments of a circuit for providing constant loop gain control for a voltage regulator are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A problem exists with voltage regulators having integrated compensation configurations. Since a particular establish fixed compensation configuration is optimal only for one output voltage, changes in the output voltage result in loop gain offsets that cause system instabilities. Therefore, there is a need for some method for canceling loop gain variations against the output voltage within a voltage regulator in order to stabilize the voltage regulator across a wide range of output voltages.

Referring now to the drawings, and more particularly to FIG. 1, there is illustrated a block diagram of a voltage regulator 100. The output voltage provided at node 112 may be programmed by changing the values of resistors 120 and 122 of the voltage divider 118. Since the fixed compensation is optimal only for one output voltage, the system will be unstable when the output voltages occur at different levels because any change in the values of the resistors 120 and 122 will result in a DC loop gain offset, crossover frequency hit and phase margin change. The loop gain within the external voltage divider 118 may be determined according to the equation:

$$G_{LOOP} = G_{COMPENSATOR} \times G_{MODULATOR} \times G_{REGULATOR} \times G_{LC} \times \frac{R1}{R1+R2}$$

Thus, the loop gain depends on the external voltage divider 118 including resistors $R_1$ and $R_2$. The system design can optimize the inner compensation parameter for some applications. However, when the customer chooses a different voltage divider in their specific design, the fixed inner compensation parameters may no longer be optimal. This will sometimes cause the system to become unstable. DC loop gain shifts with the output voltage if the compensation is fixed. This causes instability if the loop is optimized at a single voltage.

The external voltage divider presents a DC offset to the loop gain according to the equation:

$$\frac{\Delta db}{R1+R2} = \frac{V_{REF}}{V_O}$$

If the output voltage information may be determined, the voltage divider gain may be determined. This information may be used to cancel the impact of the voltage divider gains on the loop gain.

Figure 2:
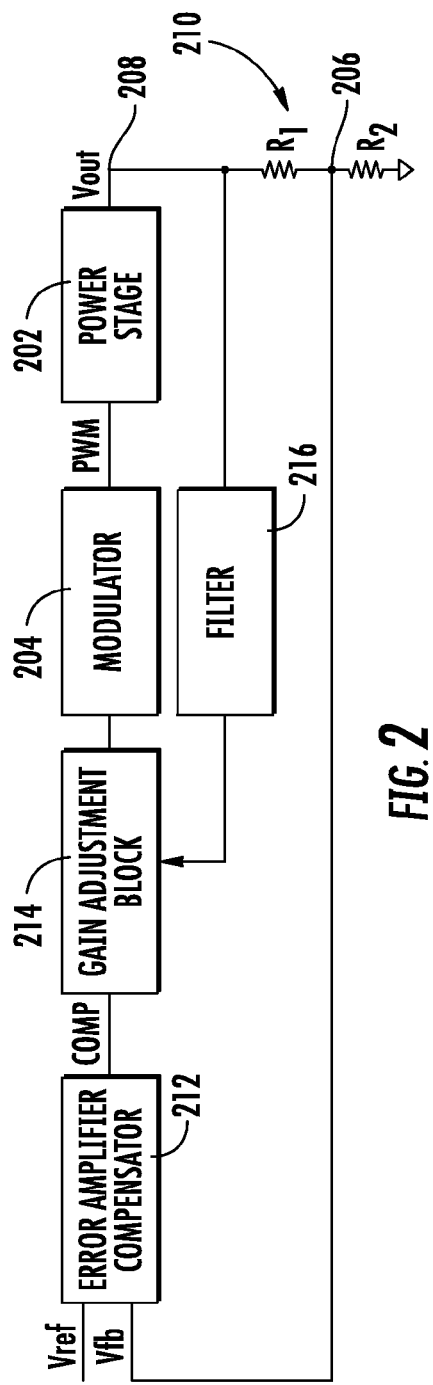
FIG. 2 is a generic block diagram of the system for providing constant loop gain control according to the present disclosure.

Referring now to FIG. 2, there is illustrated a block diagram of a generic implementation of the voltage regulator including constant loop gain control. This concept can be adapted for any voltage converter such as, non-isolated DC to DC, non-isolated AC to DC, isolated DC to AC/DC, etc. The power stage 202 can comprise any number of topologies like buck, boost, etc. In the implementation in FIG. 2, power stage 202 provides the regulated output voltage $V_{OUT}$ responsive to the provided PWM signal from the modulator 204. The feedback voltage signal $V_{FB}$ is measured at a node 206 within a voltage divider 210 consisting of resistors $R_1$ and $R_2$. Resistor $R_1$ is connected between the output voltage node 208 and node 206. The resistor $R_2$ is connected between node 206 and ground.

The voltage feedback signal $V_{FB}$ is provided to the error amplifier compensator 212 as is a reference voltage $V_{REF}$. The error amplifier compensator 212 generates a compensation voltage signal $V_{COMP}$ that is input to a gain adjustment block 214. The gain adjustment block 214 additionally receives a filtered version of the signal $V_{OUT}$ signal from node 208 that is processed by a filter 216. The gain adjustment block 214 may comprise the multiplier implementation as further described herein below with respect to FIG. 4 or other implementations. By combining the error amplifier compensator output $V_{COMP}$ with the filtered $V_{OUT}$ signal from filter 216 within the gain adjustment block 214, the impact of the loop gain caused by the voltage divider 210 may be substantially removed from the compensation signal applied to the modulator 204. This will cause a more stable PWM signal to be generated by the modulator 204 and provide stable operation of the power stage 202.

Figure 3:
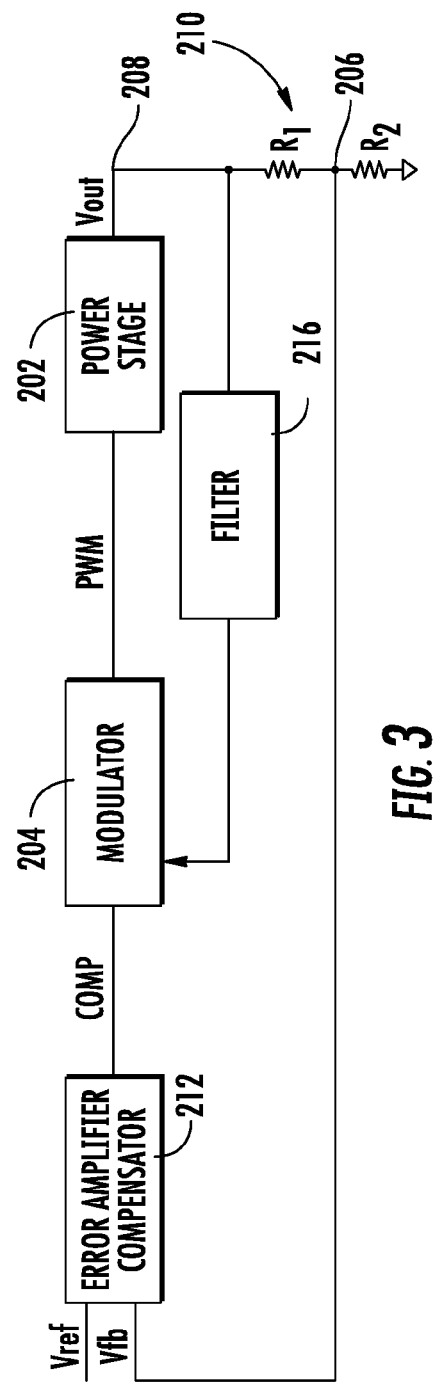
FIG. 3 is a block diagram illustrating an alternative embodiment of the implementation of FIG. 2.

In an alternative embodiment as illustrated in FIG. 3, the filtered output signal $V_{OUT}$ from the filter 216 is applied to the modulator 204 rather than to a gain adjustment block 214. The filter 216 filters the output voltage provided at the output voltage node 208 generated by the power stage 202. The output voltage $V_{OUT}$ is generated from the power stage 202 responsive to the PWM signal provided from modulator 204. The modulator 204 generates the PWM signal responsive to the filtered output from filter 216 and the compensation voltage $V_{COMP}$ provided from the error amplifier compensator 212. The $V_{COMP}$ voltage is generated by the error amplifier compensator 212 responsive to a reference voltage $V_{REF}$ and the feedback voltage $V_{FB}$ monitored at node 206 of a voltage divider network 210. As before, the voltage divider 210 is connected to the output voltage node 208. The generation of the compensated PWM signal by modulator 204 may be accomplished by adjusting the magnitude of the ramp voltage 136 generated within the modulator 204 and applied to a PWM amplifier. In this case, the error amplifier compensator 212 applies the COMP signal to the modulator 204 rather than to the gain adjustment block 214. The magnitude adjustment involves selecting a peak to peak voltage VPP that cancels the loop gain caused by the voltage divider 210 in the desired manner.

Figure 4:
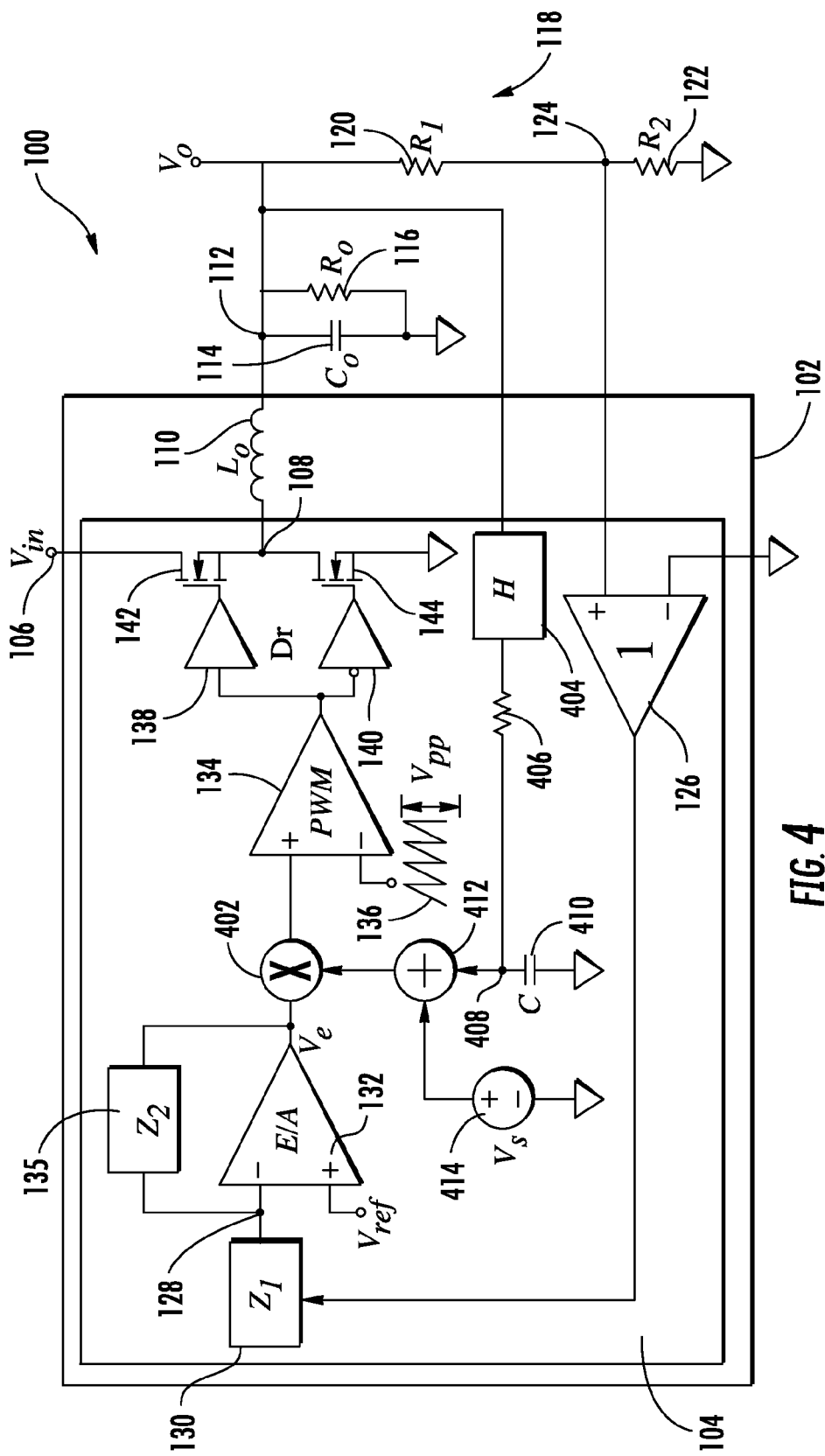
FIG. 4 is a schematic block diagram more fully illustrating a voltage regulator including constant loop gain control.

Referring now to FIG. 4, there is illustrated a voltage regulator including constant loop gain control. Power module circuitry 102 consists of an integrated controller and MOSFET switching circuitry 104 that receives an input voltage $V_{IN}$ at node 106 and generates an output voltage at a phase node 108. The phase node 108 is connected to a voltage filter consisting of an inductor 110 connected between node 108 and node 112 and a capacitor 114 connected between node 114 and ground. An output voltage $V_{OUT}$ is provided at the output node 112 and comprises the regulated output voltage $V_O$. Connected to the output voltage node 112 is a resistor 116 connected between node 112 and ground. The resistor 116 comprises a load resistor for the regulator.

Additionally, a voltage divider 118 consisting of a resistor 120 and a resistor 122 is connected between the output voltage node 112 and ground. The resistor 120 of the voltage divider network 118 is connected between node 112 and node 124. The resistor 122 of the voltage divider network 118 is connected between node 124 and ground. A feedback voltage $V_{FB}$ is provided from node 124 to a non-inverting input of a unity gain amplifier 126. The inverting input of the unity gain amplifier 126 is connected to ground. The output of the unity gain amplifier is connected to node 128 through an impedance $Z_1$ 130.

The feedback voltage from the unity gain amplifier 126 is applied through the impedance 130 to the inverting input of an error amplifier 132 that is connected to node 128. The non-inverting input of error amplifier 132 is connected to a reference voltage $V_{REF}$. Responsive to the feedback voltage $V_{FB}$ and the reference voltage $V_{REF}$, the error amplifier 132 provides an output error voltage $V_E$ to the non-inverting input of a PWM amplifier 134. An impedance $Z_2$ 135 is connected between the output of the error amplifier 132 and the inverting input of the error amplifier 132 at node 128.

A ramp voltage 136 is applied to the inverting input of the PWM amplifier 134 having a peak to peak voltage $V_{PP}$. Responsive to the error voltage $V_E$ and the ramp voltage 136 applied to the inputs of the PWM amplifier 134, the amplifier generates an output PWM signal that is applied to the inputs of an upper gate drive circuit 138 and a lower gate drive circuit 140. The upper gate drive 138 generates a PWM drive signal to a gate of upper transistor 142. The upper transistor 142 has its drain/source path connected between the input voltage node 106 and the phase node 108. Drive circuit 140 comprises an inverting drive circuit which inverts the provided PWM input signal from the PWM amplifier 134 and generates a PWM drive signal to a gate of lower switching transistor 144.

The output of the error amplifier 132 is provided to a multiplier 402. The multiplier 402 multiplies the error voltage $V_E$ with a sensed output voltage that has been filtered as described below. The sensed output voltage is monitored at node 112 through a transfer function 404. The output of the transfer function 404 is applied through a resistor 406 that is connected between the output of the transfer function 404 and node 408. A capacitor 410 is connected between node 408 and ground. The RC filter consisting of resistor 406 and capacitor 410 are needed to obtain the DC output voltage information. Node 408 is connected to an adder circuit 412 which adds the filtered output voltage to an output from a voltage source 414. The transfer function 404, resistor 406, capacitor 410, adder 412, voltage source 414 and multiplier 402 comprise a feed forward circuit that cancel the DC offset gains of the external voltage divider circuit 118. The added signal from the adder circuit 414 is multiplied with the error voltage $V_E$ at the multiplier 402. The voltage source 414 is a small voltage source that is needed to start the circuit running during startup from zero volts.

The output of the multiplier 402 is applied to the non-inverting input of the PWM amplifier 134. The effect of the multiplier 402 removes the loop gain of the voltage divider 118 and limits the output of the voltage divider upon the overall loop gain. As mentioned previously, the loop gain is defined by the equation:

$$G_{LOOP} = G_{COMPENSATOR} \times G_{MODULATOR} \times G_{REGULATOR} \times G_{LC} \times \frac{R2}{R1 + R2 \times H \times V_{OUT}}.$$

This equation may be simplified to:

$$G_{LOOP} = G_{COMPENSATOR} \times G_{MODULATOR} \times G_{REGULATOR} \times G_{LC} \times H \times V_{REF}$$

Thus, the loop gain is independent of the external voltage divider circuit 118 using the above described feed forward circuit to cancel the voltage divider circuit 118 loop gain effects.

Figure 5:
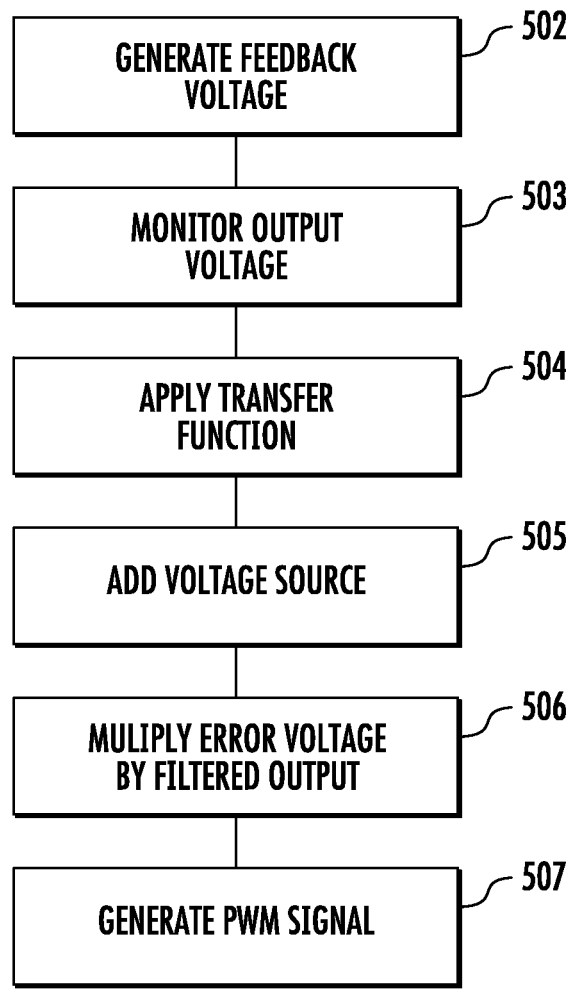
FIG. 5 is a flow diagram describing the configuration of the circuit of FIG. 4.

Referring now to FIG. 5, there is illustrated a flow diagram describing the operation of the circuitry of FIG. 4. Initially, a feedback error voltage is generated by the error amplifier 132 at step 502. The output voltage is monitored at step 503 at the output voltage node 112. The monitored output voltage node has the transfer function 404 applied thereto at step 504 to filter the output voltage. The voltage generated by the voltage source 414 is added to the filtered output voltage at step 505. The filtered output voltage is multiplied by the generated error voltage $V_E$ at step 506 to generate the compensated signal. The compensated signal is used to generate a PWM signal at step 507 by the PWM amplifier 134. These PWM signals are used for generating the drive signals to the switching transistors of the buck regulator.

This solution provides a simple implementation that does not have an impact on soft start or transient response of the voltage regulator. The circuitry can be integrated within a controller IC. The proposed constant loop gain control scheme has an output voltage feed forward block which is used to cancel the output voltage effect and system loop gain. As a result, the circuitry is able to achieve a constant loop gain against the output voltage change.

It will be appreciated by those skilled in the art having the benefit of this disclosure that this constant loop gain control for a voltage regulator. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A voltage regulation circuit having a first feedback loop with a loop gain, the voltage regulation circuit comprising:
   a power stage configured to generate a regulated output voltage responsive to an input voltage and at least one PWM signal;
   a voltage divider circuit connected to the output of the power stage and configured to generate a feedback voltage from the regulated output voltage;
   a second feedback loop including a filter connected to the regulated output voltage and configured to provide a filtered output voltage signal;
   first circuitry configured to generate the at least one PWM signal responsive to a voltage error signal, the filtered output voltage signal from the second feedback loop, and a ramp voltage signal, wherein the first circuitry is configured to use the filtered output voltage signal for substantially removing a loop-gain variation of the first feedback loop due to the voltage divider circuit; and
   a voltage compensation circuit configured to generate the voltage error signal responsive to the feedback voltage and a reference voltage.

2. The voltage regulation circuit of claim 1, wherein the first circuitry further comprises:
   a gain adjustment circuit configured to adjust a gain of the voltage error signal for substantially removing the loop-gain variation due to the voltage divider circuit by processing the filtered output voltage signal with the voltage error signal; and
   a modulator configured to generate the at least one PWM signal responsive to the gain adjusted voltage error signal and the ramp voltage signal.

3. The voltage regulation circuit of claim 2, wherein the modulator comprises a comparator configured to generate the PWM signal responsive to the gain adjusted voltage error signal and the ramp signal.

4. The voltage regulation circuit of claim 2, wherein the filter comprises a transfer function configured to filter the regulated output voltage.

5. The voltage regulation circuit of claim 4, wherein the gain adjustment circuit further comprises:
   an adder circuit configured to add the filtered regulated output voltage with a first voltage provided by a voltage source to provide the filtered output voltage; and
   a multiplier circuit configured to multiply the voltage error signal with the filtered output voltage to substantially remove the loop-gain variation caused by the voltage divider circuit.

6. The voltage regulation circuit of claim 5, wherein the first voltage provided by the voltage source is configured to enable the voltage regulation circuit to begin running at startup.

7. The voltage regulation circuit of claim 1, wherein the voltage compensation circuit comprises an error amplifier configured to generate the voltage error signal responsive to the feedback voltage and the reference voltage.

8. The voltage regulation circuit of claim 1, wherein the first circuitry further comprises a modulator configured to generate the at least one PWM signal responsive to the voltage error signal, the filtered output voltage and the ramp voltage, wherein a magnitude of the ramp voltage is selected to substantially remove the loop-gain variation due to the voltage divider circuit.

9. An integrated circuit for controlling a voltage regulator having a first feedback loop with a loop gain, the integrated circuit comprising:
   a pair of switching transistors configured to generate a phase voltage responsive to an input voltage and drive control signals;
   driver circuitry configured to generate the drive control signals responsive to a PWM signal;
   a second feedback loop including filter connected to the regulated output voltage and configured to provide a filtered output voltage signal;
   first circuitry configured to generate the PWM signal responsive to a voltage error signal, the filtered output voltage signal from the second feedback loop, and a ramp voltage signal, wherein the first circuitry is configured to use the filtered output voltage signal for substantially removing a loop-gain variation of the first feedback loop due to a voltage divider circuit connected to an output of the voltage regulator; and
   a voltage compensation circuit configured to generate the voltage error signal responsive to a feedback voltage and a reference voltage.

10. The integrated circuit of claim 9, wherein the first circuitry further comprises:
    a gain adjustment circuit configured to adjust a gain of the voltage error signal for substantially removing the loop-gain variation due to the voltage divider circuit from the voltage error signal by processing the filtered output voltage signal with the voltage error signal; and
    a modulator configured to generate the at least one PWM signal responsive to the gain adjusted voltage error signal and the ramp voltage signal.

11. The integrated circuit of claim 10, wherein the modulator comprises a comparator configured to generate the PWM signal responsive to the gain adjusted voltage error signal and the ramp signal.

12. The integrated circuit of claim 9, wherein the voltage compensation circuit comprises an error amplifier configured to generate the voltage error signal responsive to the feedback voltage and the reference voltage.

13. The integrated circuit of claim 9, wherein the first circuitry further comprises a modulator configured to generate the PWM signal responsive to the voltage error signal, the filtered output voltage signal, and the ramp voltage, wherein a magnitude of the ramp voltage is selected to substantially remove the loon-gain variation due to the voltage divider circuit.

14. The integrated circuit of claim 9, wherein the filter comprises a transfer function configured to filter the regulated output voltage.

15. The integrated circuit of claim 14, wherein the gain adjustment circuit further comprises:
    an adder circuit configured to add the filtered regulated output voltage with a first voltage provided by a voltage source to provide the filtered output voltage; and
    a multiplier circuit configured to multiply the voltage error signal with the filtered output voltage to substantially remove the loop-gain variation caused by the voltage divider circuit.

16. The integrated circuit of claim 15, wherein the first voltage provided by the voltage source is configured to enable the voltage regulation circuit to begin running at startup.

17. A method of voltage regulation comprising the steps of:
    generating a regulated output voltage by utilizing a first feedback loop having a loop gain, responsive to an input voltage and at least one PWM signal;
    monitoring a feedback voltage through a voltage divider;
    monitoring the regulated output voltage;
    filtering the regulated output voltage by utilizing a second feedback loop;

generating a voltage error signal responsive to the feedback voltage and the reference voltage;

removing a component of the loop gain of the first feedback loop caused by the voltage divider from the voltage error signal responsive to the filtered regulated output voltage; and generating the at least one PWM signal responsive to the voltage error signal having the component of the loop gain removed therefrom.

18. The method of claim 17, wherein the step of removing further comprises the step of processing the filtered output voltage signal with the voltage error signal to remove the component of the loop gain caused by the voltage divider circuit.

19. The method of claim 18, wherein the step of removing further comprises the steps of:

filtering the regulated output voltage using a transfer function;

adding the filtered regulated output voltage with a first voltage provided by a voltage source to provide the filtered output voltage; and multiplying the voltage error signal with the filtered output voltage to substantially remove the component of the loop gain caused by the voltage divider circuit.

20. The method of claim 17, wherein the step of generating the at least one PWM signal further comprises the step of generating the at least one PWM signal responsive to a gain adjusted voltage error signal and a ramp signal.

21. The method of claim 17, wherein the step of generating the voltage error signal comprises the step of comparing the voltage error signal responsive to the feedback voltage and a reference voltage.

22. The voltage method of claim 17, wherein the step of removing further comprises the step of:

selecting a magnitude of a ramp voltage used to generate the at least one PWM signal responsive to the filtered output voltage; and generating the at least one PWM signal responsive to the voltage error signal and the ramp voltage, wherein a magnitude of the ramp voltage is selected to substantially remove the component of the loop gain caused by the voltage divider circuit.

* * * * *

UNITED STATES PATENT AND TRADEMARK OFFICE
CERTIFICATE OF CORRECTION

PATENT NO. : 8,575,908 B2
APPLICATION NO. : 12/539035
DATED : November 5, 2013
INVENTOR(S) : Weihong Qiu, Shangyang Xiao and Nattorn Pongratanankul It is certified that error appears in the above-identified patent and that said Letters Patent is hereby corrected as shown below:

In the claims
In Claim 9, Column 6, Lines 6 to 8 of the patent, the phrase "a second feedback loop including filter connected to the regulated output voltage and configured to provide a filtered output voltage signal;" should read —a second feedback loop including a filter connected to the regulated output voltage and configured to provide a filtered output voltage signal;—

Signed and Sealed this
Nineteenth Day of July, 2016

Michelle K. Lee
*Director of the United States Patent and Trademark Office*